United States Patent [19]

Pond

[11] Patent Number: 5,037,064
[45] Date of Patent: Aug. 6, 1991

[54] GATE VALVES

[75] Inventor: Richard J. Pond, Watledge, Great Britain

[73] Assignee: R. J. Pond Limited, Gloucestershire, United Kingdom

[21] Appl. No.: 554,208

[22] Filed: Jul. 17, 1990

[30] Foreign Application Priority Data

Jul. 20, 1989 [GB] United Kingdom ............ 89 16538.5

[51] Int. Cl.$^5$ .............................................. F16K 3/14
[52] U.S. Cl. ..................................... 251/195; 251/328
[58] Field of Search ................... 251/48, 54, 176, 195, 251/196, 326, 327, 328, 178

[56] References Cited

U.S. PATENT DOCUMENTS

| | | | |
|---|---|---|---|
| 4,116,419 | 9/1978 | Diehl et al. | 251/328 X |
| 4,531,710 | 7/1985 | Tuto | 251/328 X |
| 4,640,302 | 2/1987 | Lupey | 251/178 X |

FOREIGN PATENT DOCUMENTS 651474 4/1951 United Kingdom ................ 251/328

Primary Examiner—John C. Fox
Attorney, Agent, or Firm—Collard, Roe & Galgano

[57] ABSTRACT

A gate valve has opposed valve seats respectively held in position by seat holders within an outer body of the valve. Each seat is fitted into the respective holder from the outer side of the latter and retained in position, against displacement, between that holder and the surrounding valve body and in sealing engagement with a corresponding sealing/locating recess in the body. On assembly of the valve wedge members are inserted between the seat holders so that the seats are wedged tightly in location positions within the body.

15 Claims, 5 Drawing Sheets

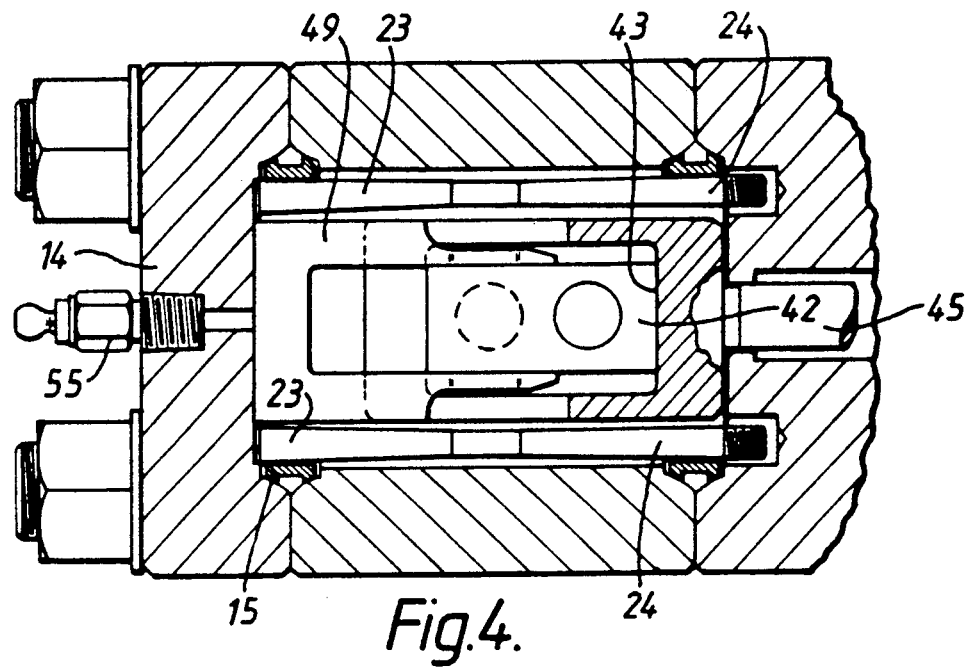
Fig.4.
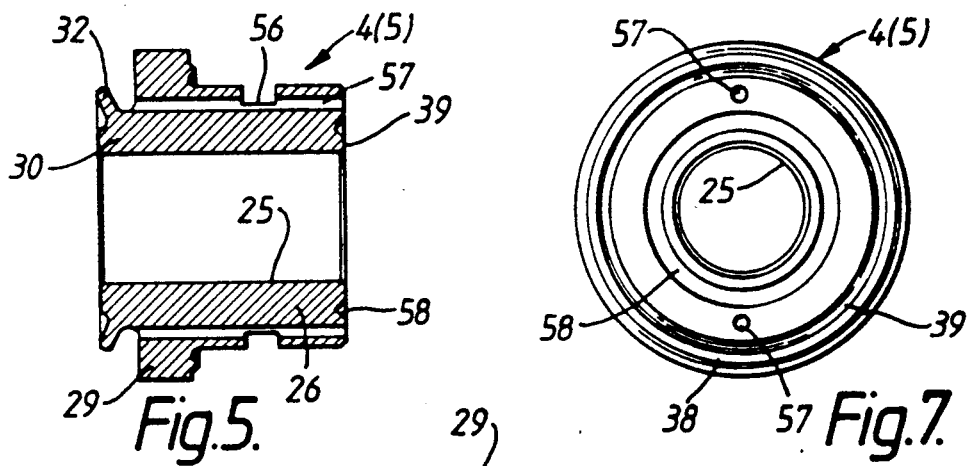
Fig.5.
Fig.7.
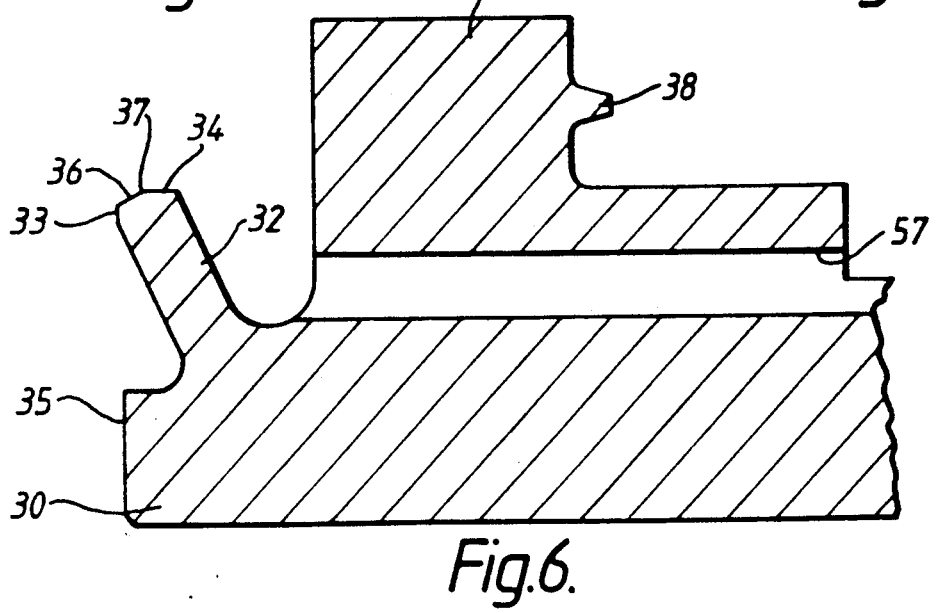
Fig.6.

GATE VALVES

BACKGROUND OF THE INVENTION

1. Field of the Invention

The invention relates to gate valves.

2. Description of the Prior Art

There are many valve installations, for example in subsea wellhead equipment, where metal-to-metal sealing is a requirement and, other things being equal, gate valves would desirably be used as they are easily produced with a metal-to-metal seal and stroking of the valve provides a self-cleaning action when the gate is held in contact with the valve seat. However, in the smaller bore sizes, for example of the order of 12.5 mm bore, the gate valves at present available suffer from serious disadvantages.

One marked disadvantage of small bore gate valves currently available is that they are unduly large for their bore size, usually being sized-down versions of larger, say 50 mm to 150 mm bore, valves. A further disadvantage is that although they theoretically provide metal-to-metal sealing the construction is such that in practice there is a possibility of movement of the valve seats fitted within the valve bodies, which immediately renders suspect the resilient seat to body seals which are employed.

SUMMARY OF THE INVENTION

The invention provides gate valves which can be designed materially to overcome the foregoing disadvantages of known gate valves.

According to the invention, a gate valve has a valve seat held in position by a seat retainer which is fitted within an outer body of the valve, with the seat fitted into the retainer from the outer side of the latter and retained in position, against displacement, between the retainer and the surrounding body.

The seat may be rigidly held by the retainer in a locating body recess. It preferably has metal-to-metal sealing with respect to the outer valve body, and desirably has deformable formations which provide this sealing. An outer end projection of the seat may sealingly engage and seat within said locating body recess.

The retainer is preferably a close fit within said outer body and it may be in the general form of a hollow bush closely fitted into a cylindrical bore in the body. For ease of assembly it may initially be a loose fit within the body and of split form with a longitudinal split into which a wedge member is inserted to expand the retainer radially, on assembly, to provide a tight fit within the body. The valve seat may be one of two opposed seats between which the valve gate is slidable between valve-open and valve-closed positions, and to ensure an initial seal the gate may be split into two parts urged apart, towards the respective seats, by spring means between the gate parts.

The seat retainer may be split diametrically into, or provided by, two similar seat holders in which the two opposed seats are respectively held, wedge members being inserted between the seat holders rigidly to hold the seats into respective locating/sealing body recesses. Two taper pins or wedges may be inserted on each side of the gate and fitted respectively from opposite ends of the seat holders, in the case of taper pins one of these conveniently being a screw-threaded pin and the other a plain pin.

Other features of the invention will be apparent from the following description, drawings and claims, the scope of the invention not being limited to the drawings themselves as the drawings are only for the purpose of illustrating ways in which the principles of the invention can be applied. Other embodiments of the invention which utilise the same or equivalent principles may be used and structural changes may be made as desired by those skilled in the art without departing from the present invention and the purview of the appended claims.

BRIEF DESCRIPTION OF THE DRAWINGS

FIGS. 3 and 4 are respectively cross-sectional views on the lines III—III and IV—IV in FIG. 2;

FIG. 5 is a detail view of a valve seat component, in cross-section and to an enlarged scale;

FIG. 6 is an enlarged view of a fragment of FIG. 5;

FIG. 7 is an inner side view of the seat component;

DESCRIPTION OF THE PREFERRED EMBODIMENTS

Figure 1:
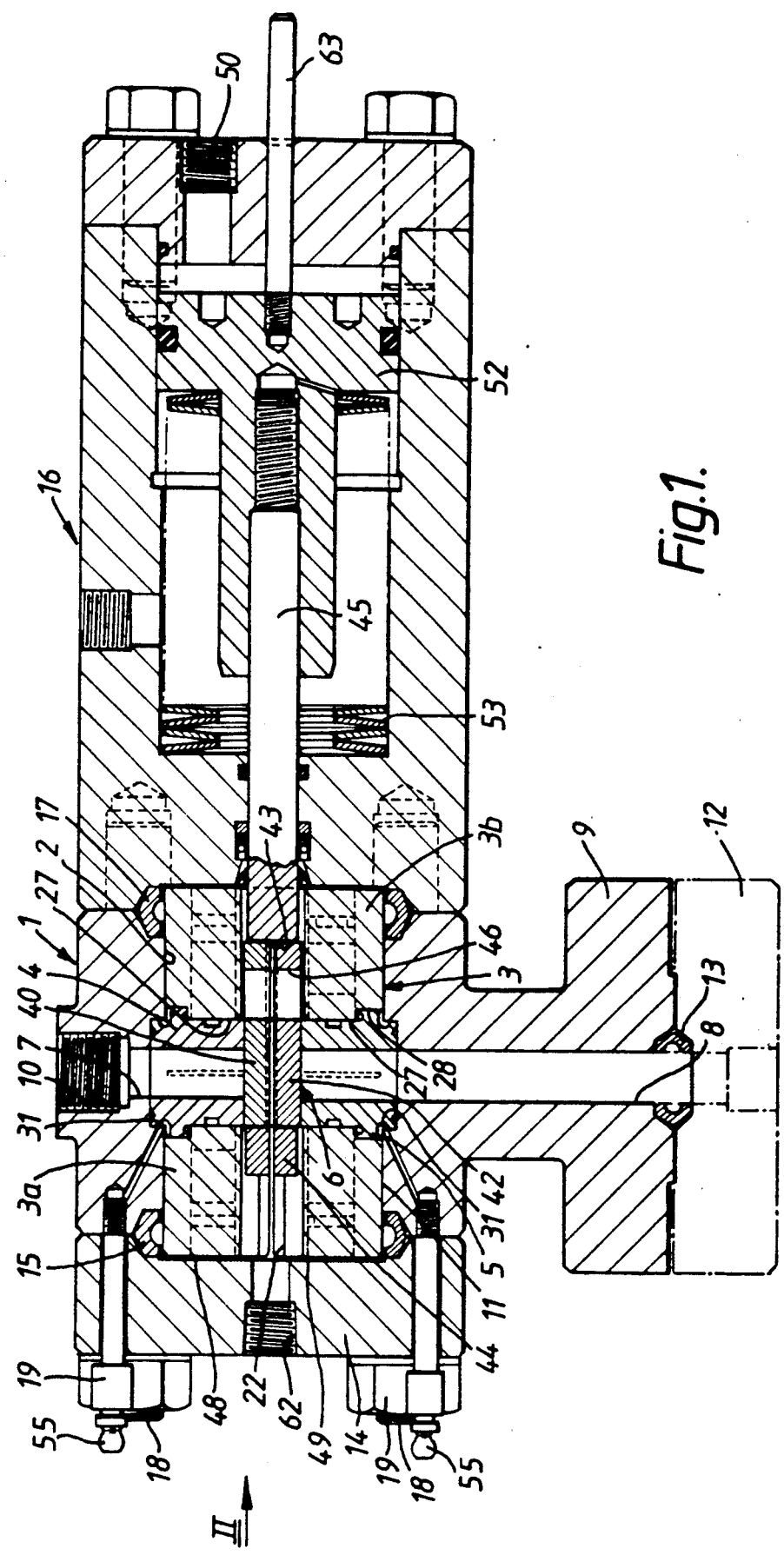
FIG. 1 is a cross-sectional view taken axially of the valve of one embodiment of the invention.

The gate valve illustrated in FIGS. 1 to 6, which is intended to be manufactured as a small bore valve of say 12.50 mm bore, comprises a metal outer body 1 with a transverse through bore 2, an internal metal seat retainer 3 of diametrically-split bush-like form, opposed metal valve seats 4 and 5, and a gate 6 slidable between and sealingly engaging the seats 4 and 5. The valve is illustrated with the gate 6 in the "closed" position, at the right-hand end of its stroke as viewed in FIG. 1.

Aligned inlet and outlet bores 7 and 8 are disposed on a central lateral axis of the body 1 at right angles to the bore 2, and the body 1 is in the form of a square-section block with a coupling flange 9 extension at the bore 8. The bore 7 has a tapped port 10 for connection in a pipeline as an optional alternative to a coupling flange and a mating pipeline flange 12 with metal seal 13 is shown, in ghost outline, as coupled to the flange 9.

The metal seat retainer 3 is longer than and projects at both ends from the body 1, and the latter is closed at one end by an end cap 14 which is dished to receive the adjacent end of the retainer 3. An annular metal seal 15 is disposed between the body 1 and end cap 14, surrounding the retainer 3. The other end of the body 1 is similarly closed and sealed by the body of a hydraulic actuator 16 and annular metal seal 17. The assembly of body 1, end cap 14 and actuator 16 are clamped together by four corner studs 18 threaded into the actuator body and with nuts 19 and the use of the metal seals 15 and 17, which as can be seen provide a pressure-assisted seal, obviates the need for clamped-up sealing gaskets.

Figure 2:
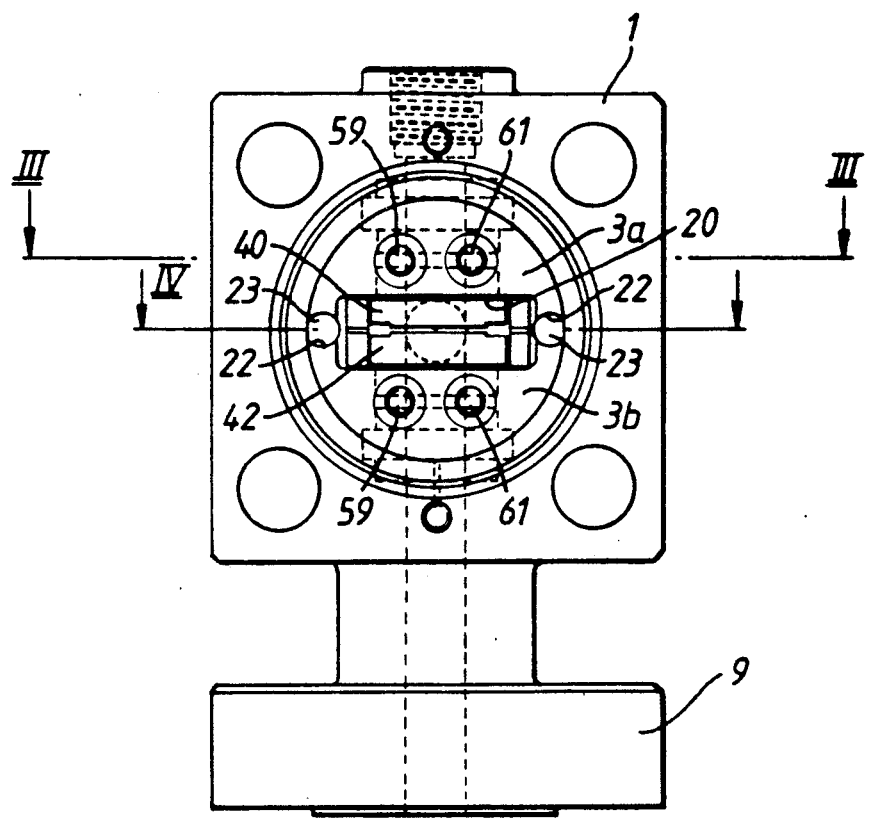
FIG. 2 is a view in the direction of the arrow II in FIG. 1, with an end cap of the valve removed to shown internal detail.
Figure 3:
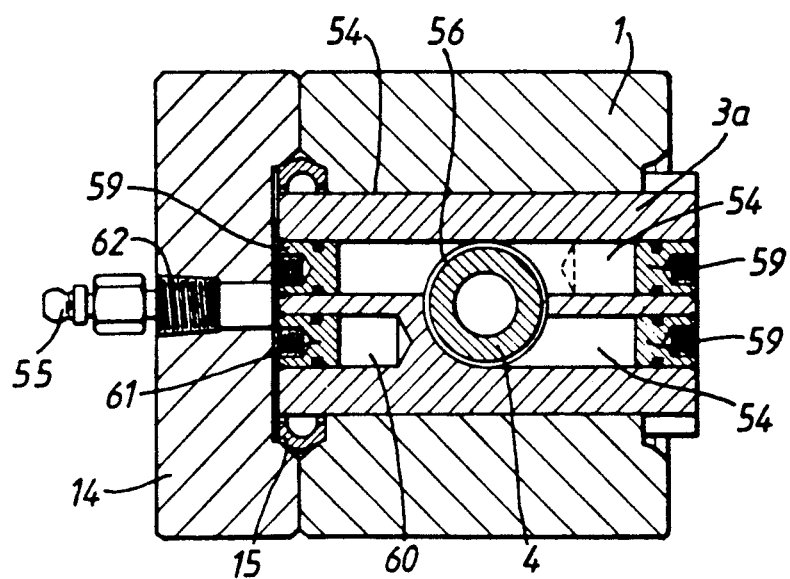

The seat retainer 3 has an outer cylindrical surface 11 which fits closely to the body bore 2 and a through "bore" 20 of elongate and generally rectangular cross-section as can be seen from FIG. 2. The retainer 3 is gapped at 22 on each side of the bore 20, whereby the retainer is split into two similar parts providing seat holders 3a and 3b in which the two seats 4 and 5 are respectively held. The splitting of the retainer 3 into separate seat holders 3a and 3b facilitates assembly (and disassembly) as the retainer can initially be freely inserted into the bore 2, whereupon at each side taper pins 23 and 24, see particularly FIG. 4, are inserted in the split gap. The pins 23 are plain taper pins whereas, for removal purposes, the pins 24 are screw threaded. With the parts 3a and 3b correctly positioned in the housing 1, the pins 23 and 24 are inserted, acting as wedge members to expand the retainer 3 radially into close contact with the body bore 2.

The form of the identical seats 4 and 5 is shown more particularly in FIGS. 5 to 7, and their retention by the retainer 3 in FIG. 1. Each seat has a through bore 25 which continues the valve inlet or outlet bore 7 or 8 to the gate 6, and a main cylindrical portion 26 which fits a mounting bore 27, in the retainer part 3a or 3b, in which the seat is housed. The bore 27 is counterbored at the radially outer end at 28, and a peripheral flange 29 on the seat bottoms in the counterbore 28 to locate the seat in the radially inward direction with its inner end face slightly proud of the corresponding holder part 3a or 3b for sealing engagement with the gate 6. At its other end each seat 4 or 5 has a projection 30 which engages in a counterbored recess 31 in the body 1, thereby locating the retainer/seat assembly axially of the body bore 2. It will be appreciated that the gapping at 22 must be wide enough to permit assembly and insertion of the retainer parts and seats until the projections 30 enter the counterbores 31. The projections 30 bottom in the counterbores 31, whereby the seats 4 and 5 are positively located against radially outward movement.

The projection 30 of each metal seat is formed with a sealing lip 32 shown to a larger scale in FIG. 6. As shown in that figure the lip 32 has a flat annular end face 33, which abuts the bottom of the corresponding counterbore 31, and a cylindrical side face 34 which closely fits the counterbore. It projects slightly beyond the end face 35 of the projection and is chamfered at 36 to produce a ridge at 37. As the taper pins 23,24 are inserted to expand the retainer 3 to fill the bore 2, the end face 35 of each valve seat 4 or 5 bottoms in the corresponding counterbore 32. This produces resilient deformation of the lip 32 which effectively pivots about the ridge 36 as a fulcrum so that it "digs into" the counterbore to provide a secondary back-up for the metal-to-metal seat/body seal at the face 35. On its inner side face each seat flange 29 has a peripheral lip of stubby frusto-conical section and this also undergoes deformation, with plastic deformation to a predetermined load, against the bottom of the corresponding counterbore 28, as the taper pins 23,24 are inserted. Thus a positive and reliable metal-to-metal seat/retainer seal is also achieved.

At its inner end each seat 4 or 5 is formed with a flat annular valve seat face 39 slidably engaged by the metal gate 6 which is of split form, with two parallel rectangular plate-like parts 40 and 42 freely but closely received in an aperture 43 in a surrounding yoke 44 which is integral with an operating rod 45 of the actuator 16. Thus, the gate parts 40 and 42 can float normally of the seat surfaces 39 of the respective seats 4 and 5 which they engage. The gate has a through bore 46 which in the valve-open position, defined by abutment of the yoke 44 with the end cap 14, is aligned with the bores 7 and 8 which are of the same diameter. Although the bores 7 and 8 have for convenience been referred to as inlet and outlet bores, the construction illustrated is not directional and reliable sealing, totally metal-to-metal in character, is obtained for either flow direction.

Leaf springs 48 and 49 respectively urge the gate parts 40 and 42 into sealing engagement with the respective seats 4 and 5, to provide an initial seal when the valve is unpressurized. During valve operation, working pressure within the body 1 acts on the operative gate part 40 or 42 to maintain a pressure-assisted seal. Each leaf spring 48 or 49 is L-shaped and is anchored by the clamping of one limb between the end cap 14 and the adjacent end of the retainer 3. The other limb of each leaf spring 48 or 49 is bifurcated at the end and angled so that it presses against the respective gate part 40 or 42 alongside the valve bore and on the lateral centre line thereof. Thus the gate parts 40 and 42 are firmly spring urged towards the seats 4 and 5 centrally of the latter at all valve positions, so that there is no tendency for the gate parts 40 and 42 to rock on the seats 4 and 5. The bifurcated formation of the operative spring limbs does not impede flow through the valve when open whilst still providing on each gate part 40 or 42 a spring force directly towards the corresponding seat 4 or 5 centrally thereof.

The hydraulic actuator 16 is shown solely by way of example, and it will be appreciated that it could be replaced by a handwheel or coupling for operation (in a subsea environment) by a diver or ROV (Remote Operating Vehicle). For hand operation an external operating bar may be fixed to a rotatable outer stem which is axially located relatively to the valve body 1, this stem being internally threaded to receive the screw-threaded outer end of the operating rod 45.

Many control variations can be offered, such as a hydraulic actuator with manual override or a hydraulic actuator with 'fail to last position' arrangement. With the actuator 16 illustrated, the application of pressure via end port 50 to the outer side of the actuator piston 52 strokes the valve to the open position, on release of actuator pressure the valve being returned to the closed position by a return spring arrangement 53 within the actuator 16. This arrangement may, as shown, comprise a stack of Belleville washers. A projecting indicator rod 63 provides an external visual indication of valve position.

The illustrated valve has a built-in sealant injection system, which injects a sealant compound to provide an added back-up for the metal-to-metal seals. Three sealant reservoirs 54 are bored into each of the retainer parts or valve holders 3a and 3b, as clearly shown in FIG. 3, and can be recharged externally via end sealant injection nipples 55 and the spaces surrounding the respective end sealing lips 32. They communicate at the inner ends via an annular peripheral groove 56 in the corresponding seat 4 or 5, the sealant in this groove ensuring a good seat/retainer seal. The inner ends of the reservoirs also communicate with the seat surfaces 39 via feed bores 57, drilled in the seats 4 and 5 and slightly offset from annular sealant grooves 58 around the surfaces 39. Each reservoir 54 contains a piston 59 accessible to internal valve pressure, and short grooves (not shown) in the gate surfaces respectively interconnect the bores 57 and respective sealant grooves 58 when the gate 6 is in the valve-closed position. An O-ring seal on each piston 59 ensures that there is no sealant leakage into the body 1, and during normal operation with internal pressurization of the body the pistons 59 are pressure balanced once sealing is achieved.

During stroking from the open position the sealant grooves 58 are partially uncovered which allows partial replacement of sealant in the groove. With the valve fully closed and pressure applied, this pressure is also applied to the pistons 59. If there is any leakage at the metal-to-metal seals, the pistons 59 sense the pressure drop to the zero downstream (outlet) side and inject sealant as required to effect a seal.

With prior gate valves employing two gate parts slidable between opposed seats, venting arrangements have been required to meet the problem of hydraulic locking when opening the valve. In the present construction this problem has been solved in an inventive manner by providing a blind bore 60 in each retainer part 3a or 3b, with a floating piston 61 in each of these bores. These bores provide hydraulic springs which prevent a closed body volume from locking up during valve operation, on assembly the bores 60 being filled with a fluid which is of suitable compressibility.

The end cap 14 is shown with a central tapped port 62 which can be employed for external connection to the valve interior for test and checking purposes. For normal valve operation it will be closed, desirably by a bleed valve which can be opened to bleed off internal pressure should this be required.

Figure 8:
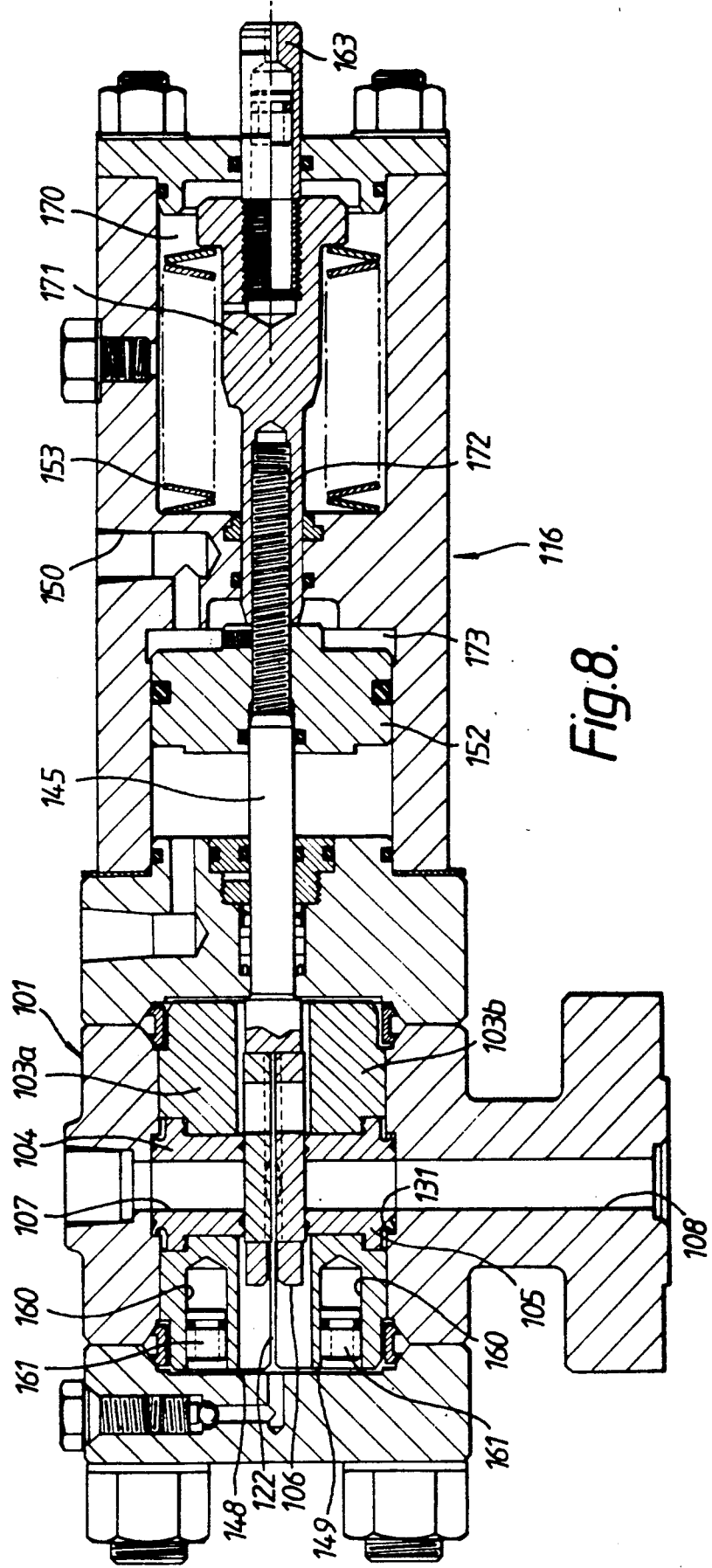
FIG. 8 is a view similar to FIG. 1 but of another embodiment.

The embodiment of FIG. 8 differs from the one already described and illustrated in the earlier figures in two significant respects. The first of these is that the sealant injection system is omitted, as this may in many cases not be considered necessary in view of the excellent and reliable metal-to-metal seal provided by the invention. The second is that the return spring arrangement is housed in a separate spring chamber 170, which has advantages particularly in maintaining hydraulic cleanliness.

Generally similar parts in this figure are identified by the same reference numerals as are used in FIGS. 1 to 7, increased by '100'. The spring stack 153 now engages a spring abutment on an actuator spindle 171 screwed on to an end extension 172 of the operating rod 145. Operating fluid pressure applied via the side port 150 is now applied to the outer side of the actuator piston 152 in an intermediate chamber 173.

Figure 9:
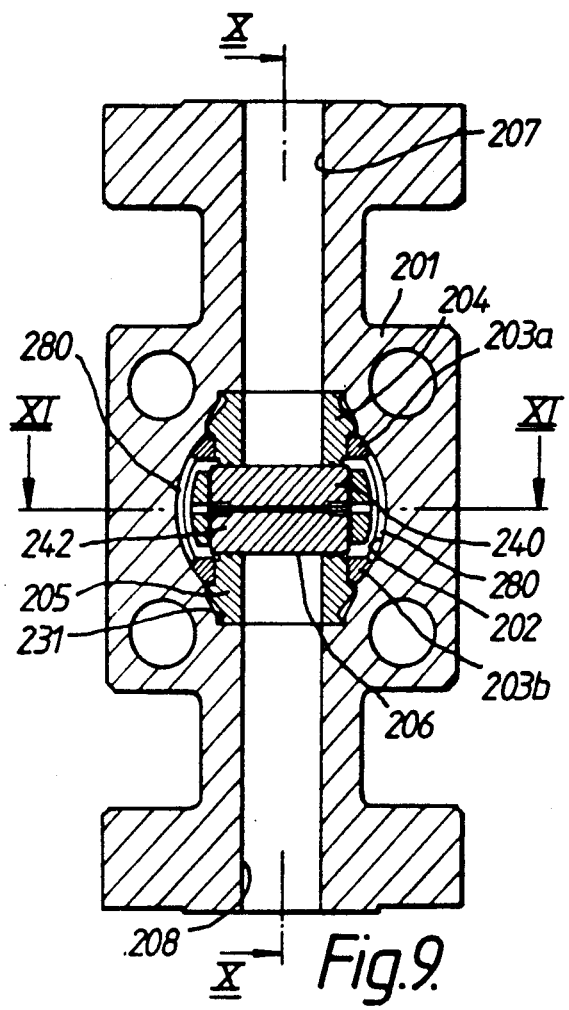
FIG. 9 is a view similar to FIG. 2 but of a further embodiment.
Figure 10:
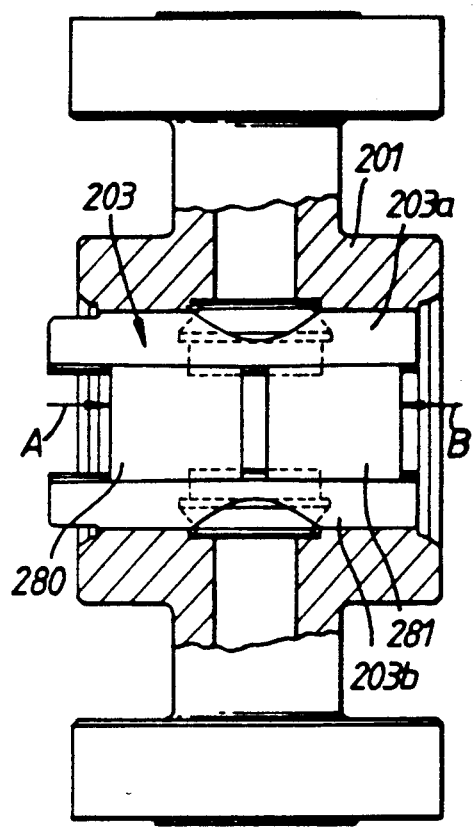
FIGS. 10 and 11 are respectively sectional views on the lines X—X and XI—XI in FIG. 9.
Figure 11:
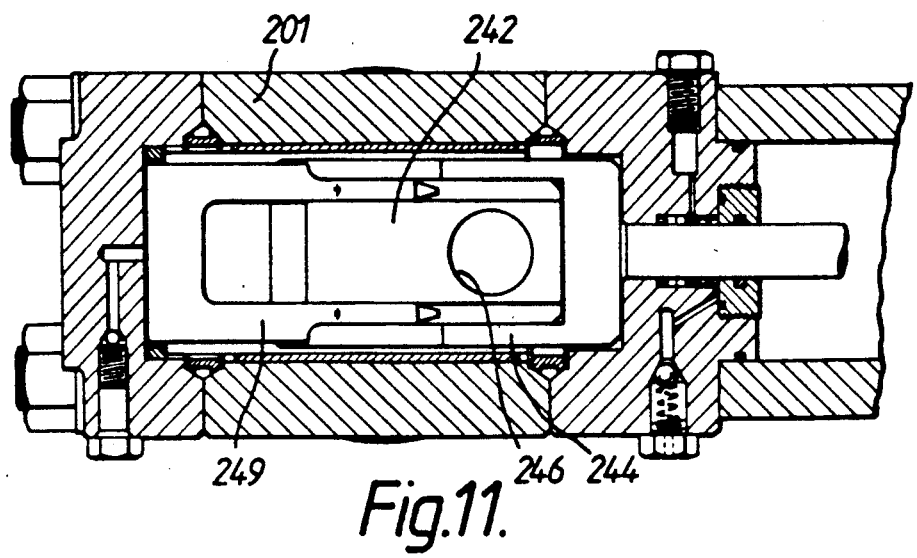

FIGS. 9 to 11 illustrate a third embodiment which employs a different form of the wedge members between the seat holders 203a and 203b, instead of the taper pins 23 and 24 of the first embodiment. In these figures like parts are identified by the same reference numerals but in this case increased by '200'. The seat holders 203a and 203b have a considerable gap between them, bridged by shell-like wedges 280 and 281 which are of arcuate cross-sectional shape fitting to the transverse bore 202 in the valve body 201. The wedges 280 are fitted on either side of the gate 206, driven in the direction of the arrow A in FIG. 10, and the wedges 281 are similarly but oppositely fitted being driven in the direction of the arrow B. In FIG. 10 the gate 206 is omitted to show a clear inner side view of the wedges 280 and 281 on one side.

As a comparison of the drawings clearly shows, use of the shell-like wedges 280 and 281 with widely spaced seat holders 203a and 203b results in a very compact construction having relatively small transverse dimensions.

It will be appreciated from the foregoing that the embodiments of gate valves illustrated and described have a number of marked advantages over conventional valve constructions. The main advantages are as follows:

1) Metal-to-metal sealing between the seats and the valve body.

2) The seats are fully retained and positively located, so that they cannot move.

3) Seat holders can readily be removed for maintenance purposes by removal of the taper pins or wedges.

4) Compact construction allows markedly reduced dimensions as compared with small bore gate valves currently available.

5) In the first embodiment sealant provides a secondary seal, gate to seat and seat to body.

6) Hydraulic springs prevent a hydraulic lock on valve operation.

While I have illustrated and described my invention in its preferred forms, it will be apparent that the same are subject to alteration and modification without departing from the underlying principles involved, and we accordingly I not desire to be limited to the specific details illustrated and described except as may be necessitated by the appendant claims.

What is claimed is:

1. A gate valve comprising an outer valve body, an internal valve seat and a seat retainer, wherein the valve seat is held in position by the seat retainer which is fitted within said outer body of the valve, the seat being fitted into the retainer from the outer side of the later and retained in position, against displacement, between the retainer and the surrounding valve body, and wherein the seat retainer is in the general form of a hollow bush which is initially a loose fit within the body and is of split form with a longitudinal split into which a wedge member is inserted to expand the retainer radially, on assembly, to provide a tight fit of the retainer within the valve body.

2. A gate valve according to claim 1, wherein the valve seat is rigidly held by the seat retainer in a locating recess in the valve body.

3. A gate valve according to claim 1, wherein the seat has metal-to-metal sealing with respect to the valve body.

4. A gate valve according to claim 3, wherein the seat has a deformable formation which provides said metal-to-metal sealing.

5. A gate valve according to claim 4, wherein the valve seat is rigidly held by the seat retainer in a locating and sealing recess in the valve body and said deformable formation sealingly engages the valve body within said recess.

6. A gate valve according to claim 1, wherein said valve seat is one of two opposed seats between which the valve gate is slidable between valve-open and valve-closed position.

7. A gate valve according to claim 6, wherein the valve gate is split into two parts urged apart, towards and contacting the respective seats, by spring means between the gate parts.

8. A gate valve according to claim 1, wherein said valve seat is one of two opposed seats similarly held position within the valve body by said seat retainer.

9. A gate valve according to claim 1, wherein the gate floats, in a direction normal to the seat, within an actuating yoke by which it is movable between the open and closed positions.

10. A gate valve comprising an outer valve body, two opposed internal valve seats, a seat retainer and a valve gate slidable between said seats between valve-open and valve-closed positions, said valve seats being held in position by the seat retainer which is fitted within said outer body of the valve and comprises two similar seat holders in which said opposed seats are respectively held, each said seat being fitted into the corresponding one of said seat holders from the outer side thereof and retained in position against displacement, between the seat retainer and the surrounding valve body, wedge members being inserted between the seat holders at opposite sides of said gate.

11. A gate valve according to claim 10, wherein two wedge members are respectively oppositely inserted at each side of the gate between the seat holders.

12. A gate valve according to claim 11, wherein the seat retainer is in the general form of a fitting bush split diametrically to provide said two seat holders and the wedge members are taper pins, at each side of the gate one of the taper pins being a screw-threaded pin and the other a plain pin.

13. A gate valve according to claim 10, wherein the wedge members are of arcuate cross-sectional form and fit closely to the valve body.

14. A gate valve comprising an outer valve body, an internal valve seat, a seat retainer and a valve gate cooperating with the valve seat, wherein the valve seat is held in position by the seat retainer which is fitted within said outer body of the valve, the seat being fitted into the retainer from the outer side of the latter and retained in position, against displacement, between the retainer and the surrounding valve body, and means provided to supply sealant to the valve seat at the gate comprise at least one sealant reservoir rechargeable from outside the valve and provided with a piston subject to internal valve pressure, which pressure tends to feed the sealant from the reservoir into at least a continuous sealing groove in the surface of the seat, the gate having sealant bridging holes or grooves through which the sealant reservoir communicates with the sealant groove only when the gate is in a valve-closed position relative to the seat.

15. A gate valve comprising an outer valve body, an internal valve seat and a seat retainer, wherein the valve seat is held in position by the seat retainer which is fitted within said outer body of the valve, the seat being fitted into the retainer from the outer side of the latter and retained in position, against displacement, between the retainer and the surrounding valve body, and wherein a blind bore in the seat retainer and in which a floating piston is slidably disposed provides a hydraulic spring, the blink bore being open to the internal body volume of the valve and containing an appropriately compressible fluid.

* * * * *